Patented Mar. 12, 1946

2,396,592

UNITED STATES PATENT OFFICE 2,396,592

NUTRIENT MATERIALS

Fredrik André Möller, Haren, near Groningen, Netherlands; vested in the Alien Property Custodian No Drawing. Application June 13, 1941, Serial No. 397,867. In the Netherlands August 15, 1940

5 Claims. (Cl. 99—83)

Be it known that cold swelling starches obtained from potato starch as a rule are not used as human food. This is mainly due to the high swelling properties of the said products. If such a cold swelling starch is dissolved in milk or water, one generally obtains a viscous paste which is slimy and sticky and consequently does not provide a tasty and enjoyable food. Cold swelling starches obtained from cereal starches such as wheat, corn and rice starch show this drawback to a lesser degree, as the cold swelling starches obtained from these cereals in the form of flakes will produce far less slimy solutions. Tapioca starch and sago starch, on the contrary, will behave like potato starch in this respect.

The present invention relates to a process of manufacturing nutrient materials from starch which do not show the disadvantages mentioned above. According to this process at least 5% of protein and not more than 100% of water, both calculated on the dry material, are added to the starch and the mixture is subjected to the cold swelling starch process.

When using the expression "cold swelling starch process" this is meant to refer to a treatment consisting in suddenly heating a mixture of starch with a relatively small proportion of water for a short time to a temperature above the gelatinizing point, preferably to about 100° C. or higher, and pressing or spreading out the tough and sticky mass on heated drums or plates by mechanical pressure to form a thin layer which is simultaneously dried. In this manner a dry film or layer is obtained which is comminuted to produce the desired coarse flakes.

The protein is preferably added in the form of skim milk powder and the invention will be described in the first place with regard to the production of nutrient materials made from potato starch and skim milk powder.

I have found that by the addition of a sufficient quantity of skim milk powder in the process of producing cold swelling starch, the properties of the cold swelling starch will be considerably changed. The resulting products will still retain the property of swelling in water, but they will dissolve to a lesser degree than the ordinary cold swelling starches, so that they will be converted into an incoherent mass of swollen cold swelling starch particles in the shape of flakes, which do not present the unpalatable, sticky and slimy consistency of the paste obtained from ordinary potato cold swelling starch.

By pouring hot milk or another aqueous liquid over the product, one obtains a nutritious dish ready for use and endowed with very appetizing properties. The product therefore is eminently suitable for home use for all kinds of dishes in which milk is employed.

In order to obtain a product having the properties described above it is necessary that the quantity of water present during the cold swelling starch process does not amount to more than 100% calculated on the total dry weight of the final product. If more water is added the proportion of dry material in the mixture which is spread out into a thin layer during the manufacturing process will be reduced and the films or layers formed by drying the same will be too thin. If such films or layers are ground into flakes, the said flakes will have too great a swelling capacity on account of their thinness, and the product obtained from the same by the addition of an aqueous liquid will have less favorable properties and consequently be less palatable. In the present process I therefore use thicker layers than in the ordinary process of manufacturing cold swelling starch, and in actual practice the quantity of water added to the mixture of starch and skim milk is generally taken considerably below the limit mentioned above, e. g. by adding 70 parts by weight of water to 100% parts by weight of the said mixture. In this manner comparatively thick flakes are obtained which will swell to a considerably lesser degree than the ordinary cold swelling starch flakes. It would be impracticable to produce layers of this thickness in the manufacture of cold swelling starch from potato starch without the addition of protein, on account of the greater adhesive properties of the cold swelling starch produced in this case.

The addition of the skim milk powder moreover will cause a considerable improvement with regard to the formation of lumps. It is known that cold swelling starch when dissolved in water has a strong tendency to form lumps and for this reason it is necessary to prepare cold swelling starch solutions by adding the cold swelling starch to the aqueous liquid in small portions, while stirring vigorously. I have found, however, that this formation of lumps will occur to a far lesser degree with the products obtained according to the invention and that it is even possible to convert the same to a homogeneous mass (pap or porridge) by simply pouring the hot milk over the flakes. This is out of the question for ordinary cold swelling starches; in this case it is always necessary to stir the dry product into the liquid.

The composition of the product is also improved by the addition of the skim milk powder, as the latter has a high protein content. The powdered skim milk is a product which has a great nutritive value, but up to the present it has been used very little for human food, because it was not very well possible to bring it into a palatable form suitable for human consumption. This now has been made possible by the present process which will provide products containing considerable quantities of milk powder in the form of flakes which by the addition of hot milk will immediately produce a palatable dish, so that they may be used e. g. instead of oatmeal porridge, rice porridge and the like. A considerable part of the vitamins present in the skim milk powder is retained in the finished product on account of the short heating time used in the cold swelling starch process, while the starch is far more easily digested in the form of cold swelling starch than in the starting material.

The properties of the flakes can be improved by incorporating calcium compounds in the flakes. The calcium compounds may be added either before, during or after the conversion of the starch into cold swelling starch. I have found that by this addition the swelling properties of the final product are diminished and as pointed out; this is a decided advantage when using the said flakes for culinary purposes.

Calcium compounds suitable for the object in view are e. g. calcium monophosphate and calciumchloride and I preferably add the same to the aqueous paste which is converted into cold swelling starch, since in this way it is easy to incorporate the calcium compound uniformly in the starch product. The proportion of calcium compound to be added may be varied between wide limits; favorable results are obtained with an addition of a few percent, calculated on dry starch.

The swelling properties of the flakes can also be substantially reduced by carrying out the heating process of the mixture of starch, water and protein in an acid medium having a pH value between 5 and 6.5. In this case it is even possible to obtain satisfactory results when the proportion of protein added is less than 5% and the invention also covers the manufacture of nutrient materials in the form of flakes containing less than 5% of protein according to the process described, if an acid is added to the mixture of starch water and protein so as to produce a pH value between 5 and 6.5.

For this purpose both inorganic acids, such as phosphoric acid, or hydrochloric acid, and organic acids, such as lactic acid, may be employed. The acid may also be added in the form of a salt with a sufficiently strong acid reaction, or in the form of a liquid produced by a biological process.

A decided improvement can also be obtained by adding substances having a slight disintegrating action on the starch molecule, such as hydrogen peroxide, to the mixture of starch, water and protein. The swelling properties of the flakes produced in this way are materially diminished by this addition and satisfactory products are already obtained from mixtures containing less than 5% of protein, calculated on dry starch.

Products of superior properties are produced when using two or more of the addition described above together with the protein, e. g. by adding both an acid and a calcium salt or an acid, a calcium salt and a substance disintegrating the starch molecule such as hydrogen peroxide to the starch-protein mixture to be subjected to the cold swelling starch process.

The invention has been described above mainly with a view to the addition of skim milk powder, but it is also possible to replace the said skim milk powder partly or entirely by other albuminous materials, such as casein, the protein of soya beans, gluten and the like. In general, however, the best results are obtained with skim milk powder. Moreover for economical reasons the conversion of skim milk powder into a useful food is highly important from an economical point of view.

If desired a part of the protein may be added by using skim milk instead of water in the cold swelling starch process.

Before, during or after the cold swelling starch process I may add substances the presence of which is desired in the finished product, such as salt, sugar or flavouring substances.

Products having special properties may be obtained by submitting the flakes produced by one of the processes described above to a further heating process at a temperature above 120° C. during at least 20 minutes.

The flake will thereby acquire a more or less brown colour and will become more brittle and the taste is improved. The temperature used may be raised in inverse ratio to the protein content; in general, however, a temperature of 140–150° C. should not be exceeded. The results of the heating treatment most likely is due to a caramelisation of the milk sugar.

The invention is particularly important for manufacturing nutrient materials in the form of flakes of the physical characteristics desired from potato, tapioca and sago starch. However, the same process can be used for other starch products, e. g. for corn, wheat and rice starch, although in this case the improvement obtained is not so pronounced as with the starting materials indicated above, as the flakes produced from cereal starches by the cold swelling starch process in the absence of protein when dissolved in water produce solutions or pastes which are of a less slimy character than those obtained from cold swelling potato starch, etc.

The invention will be illustrated by the following examples:

*Example I*

70 parts by weight of water are added to a mixture of 70 parts by weight of potato starch and 30 parts by weight of skim milk powder. The mixture is suddenly heated for a short time by applying the same to heated rollers. By this heat treatment the mixture is simultaneously dried and will produce a film or layer which is scraped from the rollers by a suitable device and ground into coarse flakes.

The flakes thus obtained are preferably served in the form of a porridge which is obtained by adding hot milk to the flakes while stirring the same. The product may of course also be used in a different manner, e. g. by adding the same to other foods.

*Example II*

90 kgs. of potato flour and 10 kgs. of skim milk powder are mixed while stirring with 85 litres of water of 60° C., in which 0.5 kg. of common salt has been dissolved. The pH of the mixture is adjusted to a value of about 6 by the addition of phosphoric acid, and the mixture is converted into cold swelling starch in the usual manner.

The films or layers obtained from the rollers are comminuted into flakes of the desired size.

*Example III*

96 kgs. of potato starch and 4 kgs. of skim milk powder are mixed while stirring with 85 litres of water of 60° C. to which 0.5–2 kgs. of calcium hydrate, 25–50 grams of hydrogen peroxide of 30% and 0.5 kg. of common salt have been added. The mass is mixed for 10 minutes, adjusted to a pH of 5.5 by adding lactic acid and converted into cold swelling starch.

*Example IV*

The product obtained according to one of the preceding examples is heated during half an hour to a temperature of 130° C., whereby the flakes are more or less colored and grow brittle.

I claim:

1. A process of preparing nutrient materials from potato starch which comprises adding to the starch an amount of skim milk powder less than the amount of starch but at least 5% thereof and an amount of water not exceeding the amount of the starch but sufficient, on heating, to bring about gelatinization of the starch, mixing the starch, milk powder and water and suddenly heating the mixture in the form of a thin layer to gelatinize the starch and dry it simultaneously, and finally comminuting the dry product.

2. A process of preparing nutrient materials from potato starch which comprises adding to the starch an amount of skim milk powder less than the amount of the starch but at least 5% thereof, an amount of water not exceeding the amount of the starch but sufficient, on heating, to bring about gelatinization of the starch, and a soluble calcium compound in an amount not exceeding a few percent, mixing the starch, milk powder, water and calcium compound, suddenly heating the mixture in the form of a thin layer to gelatinize the starch and dry it simultaneously, and finally comminuting the dry product.

3. A process of preparing nutrient materials from a starch from the group consisting of potato starch, tapioca starch and sago starch, which comprises adding to the starch an amount of skim milk powder less than the amount of the starch but at least 5% thereof, an amount of water not exceeding the amount of the starch but sufficient, on heating, to bring about gelatinization of the starch, and a soluble calcium compound in an amount not exceeding a few percent, mixing the starch, milk powder, water and calcium compound, suddenly heating the mixture in the form of a thin layer to gelatinize the starch and dry it simultaneously, and finally comminuting the dry product.

4. A process of preparing nutrient materials from a starch from the group consisting of potato starch, tapioca starch and sago starch which comprises adding to the starch an amount of skim milk powder less than the amount of the starch but at least 5% thereof, an amount of water not exceeding the amount of the starch but sufficient, on heating, to bring about gelatinization of the starch, and a compound from the class consisting of acids and salts which give an acid reaction in an amount sufficient to bring the acidity to a pH between about 5 and 6.5, mixing the starch, skim milk, water and acid reacting compound, suddenly heating the mixture in the form of a thin layer to gelatinize the starch and dry it simultaneously, and finally comminuting the dry product.

5. A process of preparing nutrient materials from potato starch which comprises adding to the starch an amount of skim milk powder less than the amount of the starch but at least 5% thereof, an amount of water not exceeding the amount of the starch but sufficient, on heating, to bring about gelatinization of the starch, and a small amount of hydrogen peroxide to cause disintegration of the starch molecule, mixing the starch, skim milk powder, water and hydrogen peroxide, heating to gelatinize the starch, drying the resultant mixture while in the form of a layer, comminuting the resulting dry product and heating the dry comminuted product at a temperature of between about 120° C. and 150° C. for at least 20 minutes.

FREDRIK ANDRÉ MÖLLER.